United States Patent Office 3,364,168

Patented Jan. 16, 1968

3,364,168

BINDER COMPOSITIONS COMPRISING POLYETHYLENE, STEAM-CRACKED PETROLEUM RESIN AND A PETROLEUM HYDROCARBON OIL AND AGGREGATE CONTAINING PAVING COMPOSITIONS PREPARED THEREFROM

Albert M. Gessler, Cranford, and William J. Sparks, Westfield, N.J., assignors to Esso Research and Engineering Company, a corporation of Delaware No Drawing. Continuation-in-part of application Ser. No. 168,798, Jan. 25, 1962. This application Apr. 26, 1965, Ser. No. 451,057

5 Claims. (Cl. 260—33.6)

ABSTRACT OF THE DISCLOSURE

High pressure polyethylene having a low density and a high degree of branching with a molecular weight between about 1,000 and 30,000, preferably between about 1,500 and 3,500 incorporated in quantities of between 5 and 15% by weight in a binder composition containing a major proportion of a petroleum resin and a substantial portion of a petroleum hydrocarbon oil to produce binder compositions of good workability that can be used to formulate aggregate binder mixtures which give paved surfaces and substrates with excellent final properties.

This application is a continuation-in-part of prior application Ser. No. 168,798, filed Jan. 25, 1962, now abandoned, which in turn is a continuation-in-part of Ser. No. 20,548, filed Apr. 7, 1960, now abandoned, which in turn is a continuation-in-part of Ser. No. 831,044, filed Aug. 3, 1959, now U.S. Patent No. 3,070,568, issued Dec. 25, 1962.

The present invention relates to novel resinous binder compositions and to paving compositions comprising mineral aggregates and/or fillers bonded with these novel resinous binder compositions.

The subject matter of U.S. Patent No. 3,070,568 relates to novel binder compositions comprising steam-cracked petroleum resins, in admixture with polyethylene. Such a bonding composition when mixed with mineral aggregates customarily employed in the production of road substrates and road surface layers yields a thermoplastic composition having excellent oil resistance, high strength and good flexibility characteristics over a wide temperature range. It was found that lateral cracking of the paving surface could be eliminated, while at the same time overcoming the problem of difficult mixing, when the petroleum resin was mixed with two polyethylenes having different molecular weight ranges. Suitable polyethylenes useful in the novel binders therein described are of relatively low molecular weight, e.g. about 1,000 to 10,000, or intermediate molecular weight, e.g. about 20,000 to 30,000 or so of low density type, or of the more recently developed high-crystalling, high-density type, having higher molecular weight ranges, e.g. about 40,000 to 200,000 or more made either by an aluminum triethyl-$TiCl_4$ type catalyst or by a chromium oxide on reduced silica-type catalyst. Copolymers of ethylene with minor amounts of comonomers, e.g. the ethylene-propylene, ethylene-butylene, styrene-ethylene, etc. may be used. The petroleum resin was employed in an amount ranging from between about 5 and 90%, preferably 10 to 50% by weight, based on the total mixture. This resinous binder was then employed in conjunction with mineral aggregates to the extent of from 1 to 10%, preferably 4 to 7% by weight. Marshall stability (at 140° F.) of at least 2,000 lbs., flow of about 4–25, were attained and thought to be required for the ultimate bonded aggregates. While this type of resinous binder composition was thought to be at the time, and is in fact, a great improvement in the art of road paving over the conventionally employed asphalt binders, the laying down of road substrates and road surface aggregate-binder compositions has been found to require substantially less stringent Marshall Stability and the like, with no attendant loss in the other desirable properties achieved through the use of resinous binder compositions. For example, compositions with less Marshall stability, but having good means of handling characteristics, fuel resistance and adequate stability to atmospheric temperature variations still exhibit good load carrying characteristics, since the Marshall stabilities, although lower than those described in the parent application, are still higher than the corresponding paving compositions bonded by the means of the conventional asphalt binders.

It has now been discovered that the desirable properties of paving compositions and of paving aggregate binders can be further enhanced by using a refined grade of lube oil of either paraffinic, naphthenic or mixed petroleum origin, if certain physical properties of the lube oil stocks are adhered to. Additionally, it has been found that somewhat higher percentages of the plasticizing lube oil stocks are desirable. By so altering the relative amount of lube oils present in the binder composition, improved workability of the binder in compounding it with aggregates is achieved. Additionally, it has been found that it is unnecessary if the higher amounts of lube oil or other hydrocarbon oil plasticizers are used to employ mixtures of high and low molecular weight polyethylenes, and the excellent final properties of the paved surfaces and substrates are attainable when the binder contains only the relatively low or intermediate molecular weight polyethylene. It has likewise been found that the amounts of polyethylene can be reduced somewhat, thus aiding improved workability, while at the same time attaining good structural and temperature stabilities, fuel resistance and Marshall stabilities. Any tendency toward lateral cracking is largely eliminated, because the improved binder employed has a high concentration of softening oil, relatively high viscosity and freedom from temperature susceptibility.

The polyethylene employed in preparing the novel binders should be of the low-density, high-branched type prepared by conventional high pressure reactions, such as by the process of U.S. Patent No. 2,153,553. The molecular weight of these polyethylenes which are use in fabricating the novel binder compositions should be within the range of between about 1,000 and about 30,000, preferably between about 1,500 and about 3,500.

The molecular weights of polyethylene recited herein are determined either from intrinsic viscosity ($\eta$) or melt index (MI) measurements in accordance with the following equations:

$$(\eta)=7.36\times10^{-4}\overline{M}_{\eta}^{0.69}$$

$$\overline{M}_{\eta}=37{,}000-8610\log(MI)$$

where $\overline{M}_{\eta}$ is the number average molecular weight. Intrinsic viscosity is obtained in xylene at 105° C. and the melt index in accordance with ASTM method D1238–57T.

Although the amount of polyethylene is interdependent on the amounts of hydrocarbon oil and petroleum resin employed, the final properties of the compounded binder are acceptable if the binder contains generally between about 2 and about 30% by weight, based on the total weight of the binder, and preferably between about 5 and about 15% by weight, of polyethylene.

The petroleum resins derived from the cracking of petroleum hydrocarbons which are used for compounding the binder of the present invention can be any thermoplastic, relatively linear petroleum resin having a softening point between about 125° F. and about 230° F., preferably between about 150° F. and 220° F. These resins also have a melt viscosity (centistokes) of between about 100 and about 30,000, preferably between about 150 and about 20,000, while employing practical hot mixing and mastication temperatures of between about 200 and about 500° F. preferably about 250 and 400° F. They also have a cold to hot viscosity ratio (300° F. (cold)/500° F. (hot)) below 40, preferably between about 1 and about 20. The average molecular weight ranges between about 1,000 and about 1,500 and the specific gravity (25/25° C.) is between about 0.96 and about 0.98, preferably 0.97. Additionally, the carbon to hydrogen ratio of the petroleum resins lies between about 6:1 and about 7:1. The methods for preparing these resins and other properties pertinent thereto are found in our copending application, Ser. No. 831,044, now U.S. Patent No. 3,070,568, which is the parent application of our continuation-in-part application Ser. No. 20,548, now abandoned, of which this application is a continuation-in-part. The resin is employed in amounts ranging between about 50% and about 90%, preferably between about 60% and about 70%, based on the total weight of the binder.

The petroleum hydrocarbon oil employed possesses the properties previously outlined hereinbefore, i.e. it has a flash point (Cleveland open cup method) of from 300 to about 600° F., preferably 400 to 500° F., and may possess an aromaticity from about 0–90%, preferably from 60–75%. Additionally, it has a viscosity at 210° F. (Saybolt Universal seconds) of between about 20 and 300, preferably between about 50 and 200, an API gravity of between about 10 and about 40°, preferably between about 15 and 30°, and an ASTM color number of 5 or better. As previously pointed out, these oils are usually lubricating oil fractions and may be obtained from naphthenic, paraffinic, mixed naphthenic, or naphthenic-aromatic base stocks. The suitability of the particular lube oil fractions is largely determined on the basis of its physical properties and physical inspection rather than upon the type of hydrocarbons of which the lube oils are composed.

Typical petroleum hydrocarbon oils that are suitable for use are the following: A lubricating oil bright stock as obtained by deasphalting a low cold test crude oil residuum. Such an oil has a flash point of about 550° F., an API gravity of about 21° and a viscosity of 210° F. (Saybolt Universal seconds) of between about 190 and about 210 with a National Petroleum Association color of about 5. This oil is customarily referred to as Coray 200. A second specific oil which is suitable for use in practicing the present invention is a lubricating paraffinic distillate oil which has been phenol extracted and has a flash point of about 430 to 445° F., an API gravity of 250 and a viscosity (same basis as above) of between 55 and 65 seconds, and a National Petroleum Association color number of 3. This oil is sold in channels of trade as Necton 60.

The amount of hydrocarbon oil present in the binder on a weight basis is generally between about 5 and about 60%, preferably between about 10 and about 40. Thus the binder would have the following composition:

| | Amount, wt. percent | |
|---|---|---|
| | Broad | Preferred |
| Hydrocarbon resin | 50–75 | 45–65 |
| Polyethylene | 2–25 | 5–15 |
| Lubricating oil | 5–60 | 10–40 |

The aggregates to be used according to the invention may be of numerous conventional types or certain specifically adapted types, as will be discussed further hereinbelow. For thin sections or surface layers, e.g. about ¼" to ½" or so, a fine aggregate should be used, such as a sand having a grading of about ⅜" down to and including aggregate passing a 200 mesh or a finer sand ranging from 8 mesh down to and including aggregate passing 200 mesh may be used; or even finer fractions may be used, such as 20 mesh down to and including aggregate passing a 200 mesh, and with any of these, some dust-type fillers may be used, such as ground limestone, pulverized sand, silicas, clays, etc. For some purposes, these fine fillers may be used without any fine or coarse aggregates. On the other hand, for coarser sections, slabs or bulk articles, e.g. from ½" to 1 ft. or 5 ft., or more in thickness, with or without an overlying finer surface coating, large crushed aggregates can be used, such as crushed stone, gravel, and air-cooled slag, having either a mixed grading of ½" to 3", or ¼" to 2", or ½" to 1", etc. Alternatively, if a fairly thick section, e.g. 2" to 1 ft. or more is to be used without any finer surface coating, the aggregate used can be composed of both coarse and fine aggregate and can include a dust filler, such as a mixture of 100 parts by weight of coarse stone, 80 parts by weight of sand, and 4 to 5 parts by weight of powdered limestone. The above aggregates may be graded either for density and lowest voids, or for a controlled, desired amount of voids, e.g. 3%, 5%, 8%, etc. voids. The final composition, particularly as surface courses in road construction, generally comprises from about 85 to 98% mineral aggregate and preferably 91 to 95% mineral aggregate with the remaining portion of the composition constituting the resin-polyethylene-hydrocarbon oil binder. In general, the lesser amounts of binder are employed where it is desired to employ the binder in substrates and the larger amounts of binder are employed where it is desired to fabricate surface layers or courses. It is to be understood, however, that the amount of binder employed in bonding the aggregate particles can be of varied latitude, and, although from 2 to 15% binder based on the total mix as laid down is suitable and produces satisfactory results, lesser and greater amounts of binder can be employed if particular instances or if particular types of aggregate indicate that good results can be achieved using binder amounts outside of this range. The amount of binder employed in compounding any particular course of a road composition is based on a matter of expediency, cost and experience, taking into account the size distribution and specific type of aggregate locally available and employed. Typical aggregates are those disclosed in publications such as those issued by the Asphalt Institute and identified as Types I through VI as set forth in "Specifications and Construction Methods for Hot-Mix Asphalt Paving for Streets and Highways," first edition, May 1957. The disclosures are incorporated into this specification by reference, and are referred to and were used in preparing bonded aggregates referred to in Table II hereinafter.

If desired, the fine fillers to be used, e.g., crushed silicas, clays, ground limestone, or even carbon black, etc., may be subjected to severe attrition, e.g., by ball-milling with steel balls, or roll-milling one or several times through tight set steel rolls, or stamping or any other severe attrition, prior to mixing with the polymer to be coated. It has been found that severe attrition activates the surface of the filler particles at the places where the particles have been broken or otherwise attrited, and thereby provides a tighter bond when the blend of polyethylene and steam-cracked petroleum resin is subsequently coated thereon, and the mixture is shaped, compacted and cooled. Pigments may be employed by adding them to the binder or during the final mastication.

Various methods may be used in carrying out the present invention, depending upon various factors such as the particular type of resin-polyethylene composition used, the type of aggregate used and according to the type of mixing equipment available. One technique, referred to as hot plastic mixing, is to heat the resin-polyethylene blend to be used, to a temperature about 100–300° F. above its softening point, until it has softened to a hot fluid consistency, and then stir the aggregate, preferably dried and preheated, into it, preferably gradually, until the final composition is reached. The preferred method is to add binder to preheated aggregate in a pug mill or in any equipment customarily used in asphalt mixing. Then all or a portion of the hydrocarbon oil is added to the mixture after mastication of resin-aggregate to give the overall relative amounts of the various materials as previously specified. Especially if all of the heavier oil is added to the binder before mixing with aggregates, the heating oil fractions (distillate fuel fraction), if used, is added directly to the mix of binder and aggregate being worked up.

The most practical method of employing the invention when using low molecular weight polyethylene is to add the petroleum resin, low molecular weight polyethylene and lubricating oil separately and in the listed order to the hot mineral aggregate at 300–475° F. followed by high shear rate mixing. The polyethylene should be in pelletized form. A 20 mesh pellet is highly satisfactory although larger pellets can be used but these should be crushed to about 20 mesh after adding to the resin but before adding the oil. For the final mixing it is desirable to employ the usual mixing and laying equipment which is customarily employed when working with asphalt binders. When using higher molecular weight polyethylene, a blend of the petroleum resin and polyethylene is generally first made and added to the preheated mineral aggregate in conventional pug mills to attain a uniform coating of the aggregate particles with the melting or melted resin-polyethylene blend. Generally, after thorough mastication following the addition of the resin blend, the hydrocarbon oil is added, in the required amount, to the mix while it is still being worked in the pug mill or other suitable mixing equipment. A further period of mixing then follows to insure a uniform distribution of the oil through the resin blend and to insure thorough coating of the oil-treated admixture on the mineral aggregate particles. Although this is the preferred practical method of finally compounding the materials ultimately to be laid in courses for new construction and old road surfacing, there is generally nothing critical about the order of addition and the bonding of materials to the aggregate except that when using low molecular weight polyethylene separate mixing tends to give improved results. Generally all that is necessary is that the required relative amounts of aggregate, hydrocarbon oil, petroleum resin and polyethylene of relatively high molecular weight be present and throughly mixed to attain the final uniform admixture for laying down as road substrate and surface.

The following examples are illustrative of the character of the invention, but it is not intended that the invention be limited thereto.

*Example 1*

Four binder compositions were prepared using various quantities of petroleum resin, polyethylene (of about 20,000 molecular weight) and petroleum hydrocarbon lubricating oil (Coray 200). These blends were made up by mixing the three ingredients at a temperature of about 350° F. in a two roll mill mixer and continuing to mix at that temperature for about two minutes so as to secure a uniform composition. Various tests were then carried out on these blends to determine their physical properties. Table I herebelow shows the inspection of the various blends. It will be noted that the blends exhibit excellent temperature susceptibility, and high viscosity. Good non-hardening is apparent from the data appearing in the last three lines of Table I (ASTM tests: D1754–60T, D5–52, and D113–44). It will also be noted that high softening blends can be attained even at polyethylene contents as low as 7%. Additionally, Table I shows that by varying the composition of the three ingredients it is possible to alter the consistency, temperature susceptibility, ductibility, etc., to meet specific situations, while maintaining a satisfactory binder in all cases for fabricating paving compositions using mineral aggregates having a conventional size distribution of their particles.

TABLE I

| | | A | B | C | D |
|---|---|---|---|---|---|
| Binder Blend: | | | | | |
| Percent Piccopale 100 * | | 61 | 55 | 49 | 43 |
| Percent Polyethylene | | 10 | 9 | 8 | 7 |
| Percent Coray 200 | | 29 | 36 | 43 | 50 |
| ASTM No. | Properties | | | | |
| D 36–26 | Soft Point, ° F. (Ball and Ring Method) | 211 | 207 | 200 | 189 |
| D 5–52 | Penetration at 77° F. (100 grams for 5 seconds). | 18 | 35 | 72 | 236 |
| Do | Penetration at 100° F. (100 grams for 5 seconds). | 46 | 82 | 185 | ------- |
| Do | Penetration at 39.2° F. (100 grams for 5 seconds). | 2 | 3 | 9 | ------- |
| Do | Penetration at 39.2° F. (200 grams for 60 seconds). | 5 | 14 | 32 | 103 |
| D113–44 | Ductility at 77° F., cms | 12 | 9½ | 8½ | 5½ |
| E102–57 | Furol Vis. at 275° F | ------- | ------- | ------- | 416 |
| Do | Furol Vis. at 300° F | 882 | ------- | 718 | ------- |
| Do | Furol Vis. at 350° F | 389 | 305 | 184 | ------- |
| D1754–60T | Thin Film Loss Percent at 325° F | .34 | .36 | .36 | .42 |
| D5–52 | Penetration at 77° F. of Residue from Thin Film Loss Test. | 12 | 32 | 63 | 182 |
| D113–44 | Ductility at 77° F. of Residue from Thin Film Loss Test. | 12½ | 9½ | 7½ | ------- |

* A hard petroleum hydrocarbon resin produced by the polymerization of unsaturates derived from the deep cracking of petroleum, having a softening point, ball and ring of 100±3° C.; a specific gravity of 25/25° C. of .970–.975; a flash point C.O.C. of 500° F.; a refractory index at 20° C. of 1.51; an acid number of less than 1; a saponification number of less than 2; an iodine number (corrected for substitution) of 30; a bromine number of 7.3; and a molecular weight of 1,100.

*Example 2*

Piccopale 100 (the same material as employed in Example 1) was blended with polyethylene of 20,000 molecular weight in a ratio of 86 parts of petroleum resin to 14 parts of polyethylene. Various amounts of this blend were admixed with Coray 200 lubricating oil to form a binder which was employed so as to give a final aggregate-binder composition of about 93% aggregate and 7% by weight of total binder. Various types of aggregate according to size distribution were employed, and Marshall briquettes were prepared from the thoroughly mixed final aggregate-binder compositions. Temperatures of 325° F. were employed. A dough mixer was used, and the aggregate plus binder were mixed for a period of four minutes, after which the standard Marshall pellets were compressed and allowed to cool to room temperature. Marshall Stability tests were run, and inspections were made for percent voids in the briquettes and for fuel resistance. Table II sets forth the source of aggregate employed and the size distribution according to standard types as disclosed by the Asphalt Institute and identified as Types I through VI as set forth in "Specifications and Construction Methods for Hot-Mix Asphalt Paving for Streets and Highways," first edition, May 1957, Types IV, V, and VI having been employed.

TABLE II

| Binder: Percent Resin Blend Percent Coray 200 | Aggregate Particle Size Distribution [1] | Aggregate Source [2] | Marshall Stability in Lbs.[3] | Percent by Vol. Air Voids in Mix | Fuel Resistance in Hrs. |
|---|---|---|---|---|---|
| Resin-oil: | | | | | |
| 71%-29% | VI | E | 1,100 | 4.5 | 10 |
| 71%-29% | VI | F | 1,250 | 4.2 | 15 |
| 71%-29% | V | G | 1,300 | 3.8 | 12 |
| 71%-29% | IV | H | 1,560 | 4.0 | 12 |
| 71%-29% | IV | K | 1,980 | 6.5 | ---------- |
| 63%-37% | VI | L | 1,070 | 3.9 | 6 |
| 57%-43% | VI | L | 900 | 4.6 | 5 |

[1] Asphalt Institute—Specifications and Construction Methods for Hot-mix Asphalt Paving for Streets and Highways, First Edition, May, 1957.
[2] E=N.J. Trap rock—quarried sand—limestone filler.
F=N.J. Limestone—limestone screenings.
G=N.J. Trap rock—concrete sand—limestone filler.
H=N.Y. Trap rock—trap rock screenings—filler.
K=N.Y. Trap rock—limestone screenings—filler.
L=N.J. Trap rock—asphalt sand-filler.
[3] ASTM 1559-60T.

The last column in the above Table II is designed to afford an inspection and measure of the fuel resistance of the final paving compositions. The test was carried out by simply placing a Marshall briquette, 4" diameter and height of 2.5", in contact with a spray of jet fuel, the jet fuel being applied to the underside of the briquette under sufficient pressure so as to give 2½ gal. per hour of jet fuel continuously contacting the briquette surface. Periodically a wire brush was used to brush the sprayed side of the briquette with the hours of exposure required to remove ½" of surface representing the fuel ratings, in hours, in the above table. An asphalt bonded briquette, on a comparative basis, would have a fuel resistance rating of about 1½ to 2 hours. It will be seen that the poorest fuel resistance in Table II for the petroleum resin-polyethylene-Coray oil is some 3½ times better than asphalt. Comparable studies indicate that the use of asphalt binders in place of high molecular weight polyethylenes results in final road strata having lower load carrying capacity, lower Marshall stabilities and lower fuel resistance.

*Example 3*

Mineral aggregates of two specific types or size distribution were blended with each of the four binder blends described in Example 1 and Table I using 7% of the binder and 93% of the aggregate. A fifth run was carried out using asphalt as a binder for comparative purposes. The Marshall stability properties and the flow, i.e. the amount of deformation of the Marshall briquette under load at 140° F., were determined. The fuel resistance in hours was determined according to the method described with reference to Example 2 and Table II. The following Table III presents the data obtained. The aggregate type carries the same designations as noted with respect to the particle size distribution and aggregate type of Table II.

TABLE III

| Binder Blend (See Table I) | A | B | C | D | Asphalt |
|---|---|---|---|---|---|
| Aggregate Type (Asphalt Institute) | V | V | VI | VI | V |
| Marshall Properties (ASTM D1559-60T): | | | | | |
| Stability at 140° F., Lbs | 1,035 | 624 | 640 | 450 | 860 |
| Flow at 140° F., .01" amt. of deformation to failure under load | 14 | 11 | 15 | 10 | ---------- |
| Percent Voids | 4.5 | 6.0 | 3.5 | 5.0 | ---------- |
| Fuel Resistance (hrs.) | 11 | 6¾ | 5¼ | 4 | 1½ |

*Example 4*

An aggregate composition was prepared comprising 60 wt. percent of New Jersey traprock and 40% sand having the following screen analysis:

| Screen mesh, in.: | Cumulative percent passing |
|---|---|
| ⅜ | 97 |
| 4 | 52 |
| 8 | 37 |
| 16 | 32 |
| 30 | 23 |
| 50 | 13 |
| 100 | 5 |
| 200 | 2 |

In a separate operation, a preblended binder was prepared at a temperature of about 300° F. (with stirring) containing about 84.7 wt. percent of Piccopale 100 (P100) as defined in Example 1 and about 15.3 wt. percent of polyethylene having a molecular weight of about 18,000 (PE18,000). Three other blends were prepared involving the same weight ratios of Piccopale resin to polyethylene but containing respectively 25%, 30% and 45%, by weight, of Necton 60 (N60), a refined hydrocarbon oil as defined above. These four preblended binders at temperatures of about 300° F. were each admixed with separate batches of aggregate maintained at about 375° F. in sufficient amounts that the final compositions contained about 6.5 wt. percent of binder and about 93.5 wt. percent of aggregate. After thorough mixing of these ingredients and while at a temperature of about 300° F., the four separate bonded compositions were compacted into standard size Marshall briquettes which were tested according to the standard procedure for determining Marshall stability, in pounds, and Marshall flow, in units of 0.01″ of deformation to failure or breakage under load as described in Example 2.

Each of these four specific binders employed in the same amount with the same aggregate was tested for Marshall flow and Marshall stability at five temperatures, i.e. 33° F., 50° F., 75° F., 100° F., and 140° F. so that five data points with respect to Marshall flow and Marshall stability for each compounded paving aggregate containing each binder were obtained:

| Binder Contains— | Marshall Flow in 0.01″ Units at Time of Breakage Measured at— | | | | |
|---|---|---|---|---|---|
| | 33° F. | 50° F. | 75° F. | 100° F. | 140° F. |
| No oil | ---------- | 1.5 | 1.0 | 1.0 | 1.5 |
| 25% oil | 4.5 | 8.0 | ---------- | 12.0 | 13.5 |
| 30% oil | 10.5 | 11.5 | 12.5 | 11.0 | 11.5 |
| 45% oil | 10.0 | 9.0 | 10.5 | ---------- | 6.0 |
| | Marshall Stability in Pounds | | | | |
| | 33° F. | 50° F. | 75° F. | 100° F. | 140° F. |
| No oil | 30,000+ | 30,000+ | 30,000+ | 30,000 | 25,000 |
| 25% | 30,000+ | 27,200 | 14,000 | 5,300 | 2,000 |
| 30% | 5,800 | 3,100 | 1,800 | 1,200 | 600 |
| 45% | 4,000 | 2,200 | 1,600 | 1,000 | 400 |
| Asphalt | 7,400 | 4,600 | 2,600 | 1,750 | 1,000 |

From the above data, it can be seen that the binder consisting of 84.7 wt. percent of petroleum resin (P100) and 15.3% of polyethylene (PE18,000) and containing no oil plasticizer gave a bonded aggregate, regardless of the temperatures employed for testing, having Marshall stabilities in excess of 25,000 lbs. and that the Marshall flow for the binder containing no plasticizer oil gave extremely low flows before fracture because the material was essentially brittle in character, i.e. it was inflexible and thus practically unsuitable for normal paving use.

The binder containing 25 wt. percent of plasticizer oil (N60) using the same ratio of petroleum resin to polyethylene gave a briquette whose Marshall stability and Marshall flow varied widely depending upon the test temperature, the stability varying from 31,000 lbs. at 30° F. to 2,000 lbs. at 140° F. and the flow varying from 4.5 at 33° F. to 13.5 at 140° F. The 25 wt. percent oil plasticized composition represents the lower practical limit of the amount of plasticizing oil that can be incorporated into this particular ratio of petroleum resin to polyethylene, whereas the flow of the paving using a binder containing 45% plasticizer was 6.0 at 140° F., which is likewise impractical because of the excessive loss of cohesion between the binder and the particles of the aggregate. Flow normally increases with increasing temperature as shown by the data obtained when using 25–30% oil. However, when using 45% oil the flow decreases indicating loss of cohesion.

The data further show that from the combination of considerations of Marshall stability and Marshall flow, 30 wt. percent plasticizing oil in the composition gave a substantially ideal binder; that this amount of oil did not adversely influence resistance to solvency action on the binder by reason of its contact with spilled gasoline, oil drippings and the like, yet had sufficiently high load bearing qualities under all ranges of ambient temperatures to be used satisfactorily as a substitute or replacement for asphalt binders.

*Example 5*

The following three binder mixtures were prepared:

| | Wt. percent |
|---|---|
| Binder A: | |
| Piccopale 100 | 65.0 |
| Polyethylene (mol. wt. 2,000) | 4.8 |
| Necton 60 | 30.2 |
| Binder B: | |
| Piccopale 100 | 59.3 |
| Polyethylene (mol. wt. 2,000) | 10.7 |
| Necton 60 | 30.0 |
| Binder B (same as Ex. 4): | |
| Piccopale 100 | 59.3 |
| Polyethylene (mol. wt. 18,000) | 10.7 |
| Necton 60 | 30.0 |

Each of these three binders was employed in the same amount with the aggregate used in Example 4 and tested for Marshall stability at the same five temperatures described in Example 4. The following results were obtained:

| Binder Contains | Marshall Stability in Pounds Measured at— | | | | |
|---|---|---|---|---|---|
| | 33° F. | 50° F. | 75° F. | 100° F. | 140° F. |
| 4.8% PE (2,000) | 27,200 | 16,200 | 6,450 | 3,000 | 1,200 |
| 10.7% PE (2,000) | 24,200 | 15,600 | 5,200 | 2,100 | 1,900 |
| 10.7% PE (18,000) | 5,800 | 3,100 | 1,800 | 1,200 | 600 |

From the above it is clearly evident that a much higher Marshall stability is obtained over the range of temperatures from 30 to 140° F. when using polyethylene of 2,000 molecular weight instead of 18,000. The data also show that less than half of the lower molecular weight product need be used affording a substantial saving.

Thus within the broad range of the present invention there is a narrow range which affords even more startling advantages. Therefore, while the invention encompasses the use of polyethylenes having molecular weights up to about 30,000, the use of molecular weights between 1,500 and 3,500 gives maximum advantages.

*Example 6*

Piccopale 100 (same as employed in Example 1) was blended with polyethylene of 2,000 molecular weight and Necton 60 oil in a ratio of 57 parts by weight of petroleum resin to 5 parts by weight of polyethylene and 38 parts of Necton 60. The resulting binder was formed by first premixing the ingredients and then blending them with the aggregate as in Example 2, and also by separately mixing the resin, the polyethylene (20 mesh particles) and the oil in this order with the hot aggregate. Marshall stability tests were run and the following data were obtained:

| | | |
|---|---|---|
| Binder Composition: | | |
| Piccopale 100 | 57 | 57 |
| Polyethylene, 2,000 M.W | 5 | 5 |
| Necton 60 oil | 38 | 38 |
| Binder Properties (preblended): | | |
| Softening Point, ° F. (R+B) | ---------- | ---------- |
| Penetration at 77° F. (100/5) | 64 | 64 |
| Penetration at 39.2° F. (200/60) | 23 | 23 |
| Ductility at 77° F. (5 cm./min.) | 100+ | 100+ |
| Ductility at 39.2° F. (1 cm./min.) | 50+ | 50+ |
| Furol Viscosity at 275° F., sec | 121 | 121 |
| Mix Properties (FAVC at 6½%): | | |
| Marshall Stability at 140° F., lbs | [1] 1,045 | [2] 1,130 |
| Marshall Flow at 140° F. .01″ | 11 | 13 |
| Voids, Vol. percent | 5.0 | 4.2 |

[1] All binder ingredients premixed hot then added to hot aggregate.
[2] Three binder ingredients added to hot aggregate separately.

The above data show that effective results can be obtained by separate addition of the binder ingredients in comparison with premixing the ingredients and adding the premixed ingredients to the aggregate.

The nature of the present invention having been thus fully set forth, what is claimed as new and useful and desired to be secured by Letters Patent is:

1. A resinous binder composition comprising (1) between 50 and 90% by weight of a petroleum resin obtained by the polymerization of unsaturated hydrocarbons from the cracking of petroleum, having a softening point of between about 125° F. and about 230° F., an average molecular weight of between about 1,000 and about 1,500, a specific gravity (25/25° C.) of between about 0.96 and about 0.98 and a carbon to hydrogen ratio of between about 6.0:1 and about 7.0:1, (2) between 2 and 30% by weight of a low density, high branched polyethylene having a number average molecular weight of between about 1,000 and about 30,000, and (3) between about 25 and 30 wt. percent, based on the binder composition, of a petroleum hydrocarbon oil having a Saybolt Universal viscosity at 210° F. of between about 30 and about 400, an API gravity of between about 10 and about 40, an ASTM color number of at least 5 and a flash point of between about 300 and about 600° F.

2. A composition as in claim 1 wherein the petroleum resin has a softening point of 212° F., a specific gravity of about 0.97, and a number average molecular weight of about 1,100, the polyethylene has a molecular weight of about 2,000 and the hydrocarbon oil has a viscosity of about 200, a flash point of about 550° F. and an API gravity of about 21°.

3. A composition as in claim 1 wherein the composition contains about 60% of the petroleum resin, about 10% of the polyethylene, and about 30% of the hydrocarbon oil.

4. A paving composition comprising a mineral aggregate, the particles of which are bonded together with a binder composition comprising (1) between 50 and 90% by weight of a petroleum resin obtained by the polymerization of unsaturated hydrocarbons from the cracking of petroleum, having a softening point of between about 125° F. and about 230° F., an average molecular weight of between about 1,000 and about 1,500, a specific gravity (25/25° C.) of between about 0.96 and about 0.98 and a carbon to hydrogen ratio of between about 6.0:1 and about 7.0:1, (2) between 2 and 30% by weight of a low density, high branched polyethylene having a number average molecular weight of between about 1,000 and about 30,000, and (3) between about 25 and about 30 wt. percent, based on the binder composition, of a petroleum hydrocarbon oil having a Saybolt Universal viscosity at 210° F. of between about 30 and about 400, an API gravity of between about 10 and about 40, an ASTM color number of at least 5, and a flash point of between about 300 and about 600° F.

5. A composition as in claim 4 wherein the polyethylene has a number average molecular weight between 1,500 and 3,500.

References Cited

UNITED STATES PATENTS

| | | | |
|---|---|---|---|
| 3,070,557 | 12/1962 | Gessler et al. | 94—19 |
| 3,070,568 | 12/1962 | Gessler et al. | 260—41 |
| 3,093,601 | 6/1963 | Gessler et al. | 260—41 |

ALLAN LIEBERMAN, *Primary Examiner.*

MORRIS LIEBMAN, *Examiner.*